May 24, 1938.  H. G. HAGUE  2,118,195
CONVEYING APPARATUS
Filed Aug. 12, 1936   4 Sheets-Sheet 1
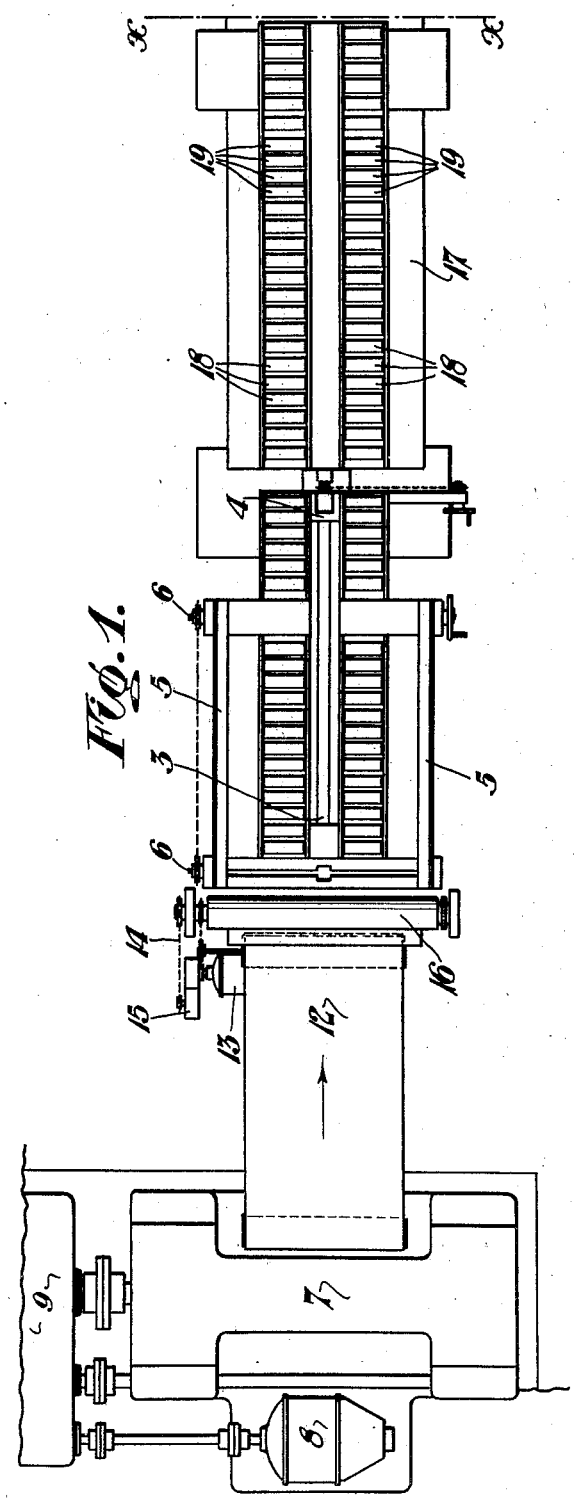
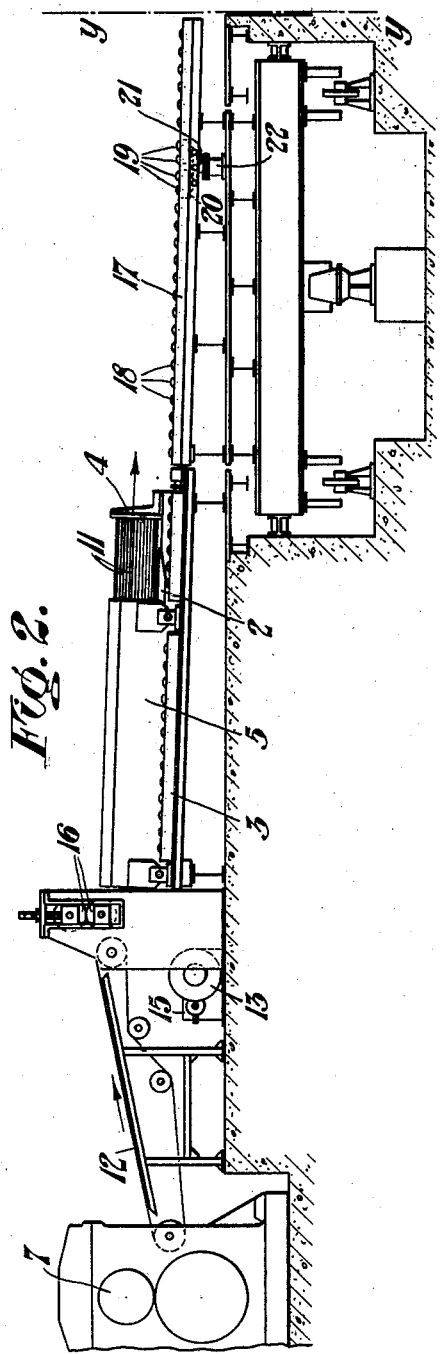
Inventor:
HARRY G. HAGUE,
by Elsina & Rauber
his Attorneys.

May 24, 1938.  H. G. HAGUE  2,118,195
CONVEYING APPARATUS
Filed Aug. 12, 1936    4 Sheets-Sheet 2
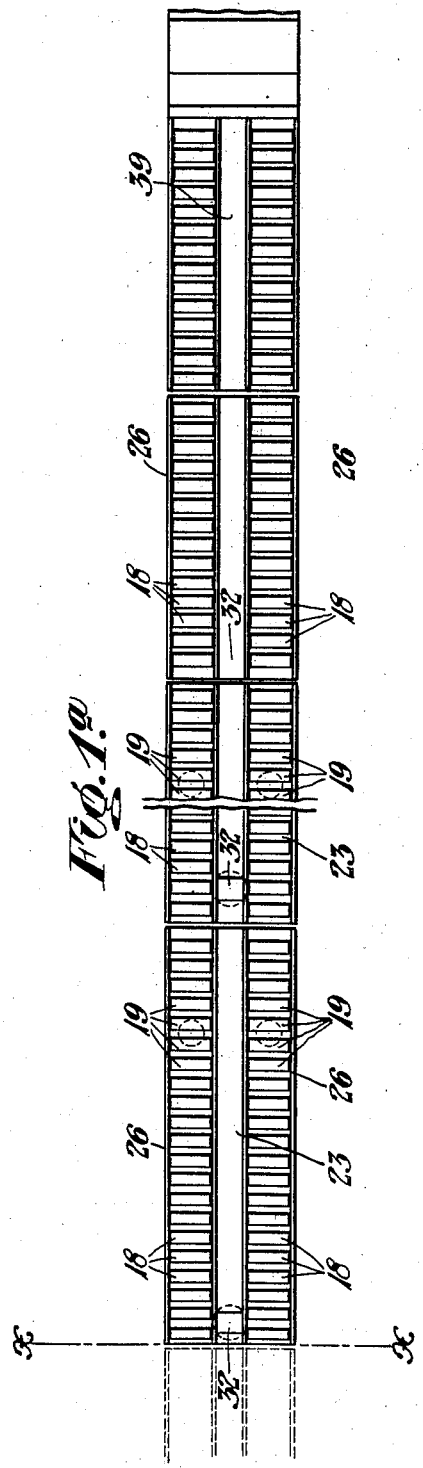
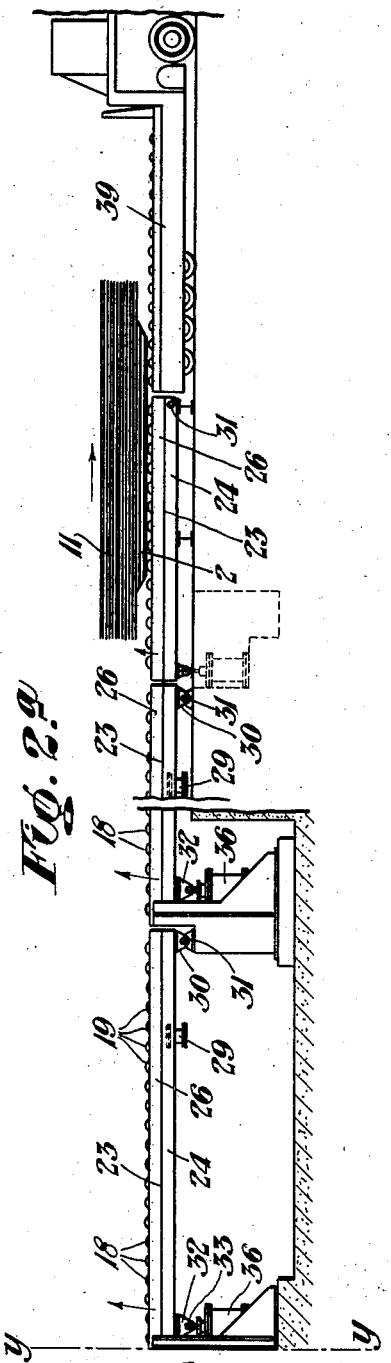
Inventor:
HARRY G. HAGUE,
by his Attorneys May 24, 1938.  H. G. HAGUE  2,118,195
CONVEYING APPARATUS
Filed Aug. 12, 1936  4 Sheets-Sheet 3
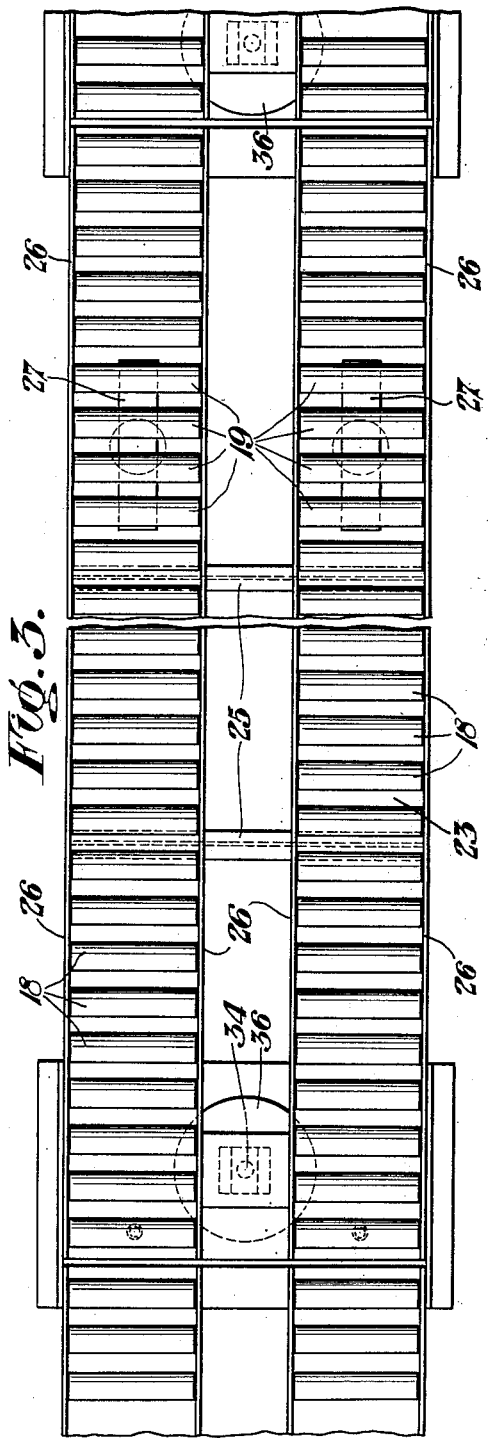
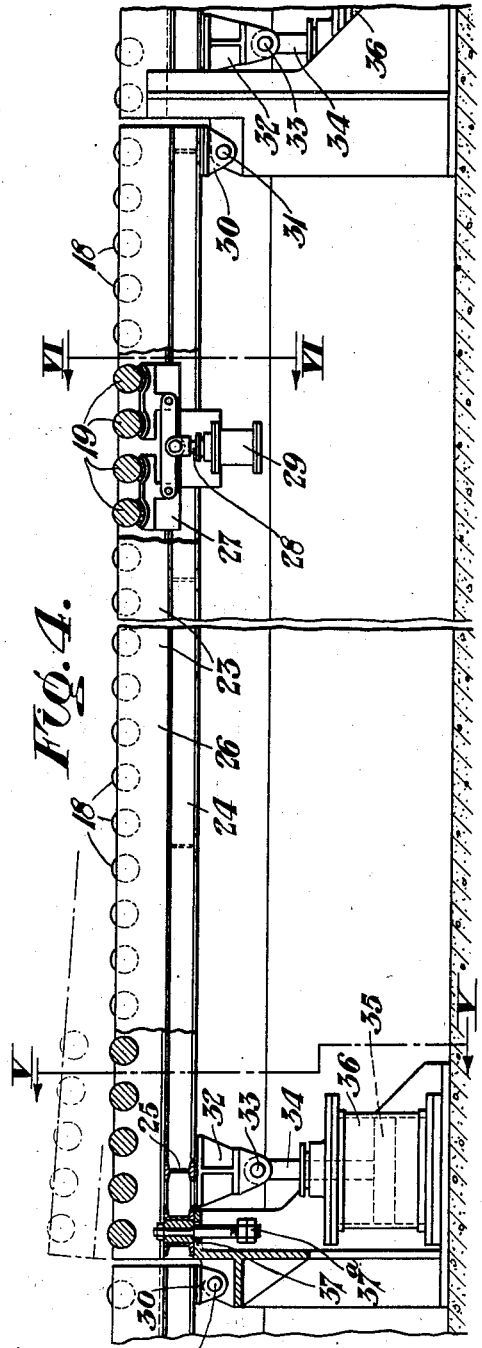
Inventor:
HARRY G. HAGUE,
by Usina & Rauber
his Attorneys.

May 24, 1938.　　　H. G. HAGUE　　　2,118,195
CONVEYING APPARATUS
Filed Aug. 12, 1936　　　4 Sheets-Sheet 4

Inventor:
HARRY G. HAGUE,
by Usina & Rauber
his Attorneys.

Patented May 24, 1938

2,118,195

UNITED STATES PATENT OFFICE 2,118,195

CONVEYING APPARATUS

Harry G. Hague, Gary, Ind.

Application August 12, 1936, Serial No. 95,654

5 Claims. (Cl. 193—35)

This invention relates to a conveying apparatus and more particularly to an apparatus for transporting piles of metallic sheet and like material.

Heretofore, the conveying of such materials has been largely confined to conveyor beds made up of closely spaced rollers parallel to each other, but at right angles to the travel of the piles of sheet thereover. These rollers were so inclined, one above the other, as to provide an inclined table whereby a gravity feed was established. These gravity feed tables necessitated considerable floor space and elevation, especially when they ran for a considerable distance. The abnormal elevation necessary for such lengthy gravity conveyors, furthermore, necessitated extra equipment, such as elevated or depressed loading and/or unloading platforms.

An object of this invention is to provide a roller type conveying apparatus which may be established for any distance, without the aid of driven rollers or the necessity of any elevational settings, to provide a means of gravity feed.

Other objects and advantages will become apparent as the description proceeds, in which:

Figure 1 is a top plan of the shearing, piling and weighing mechanism;

Figure 1ᵃ is a continuation of Figure 1 showing the abutting conveyor units;

Figure 2 is a side elevation of Figure 1;

Figure 2ᵃ is a continuation of Figure 2 showing the conveyor units in side elevation;

Figure 3 is an enlarged detailed plan, partly broken away, to show the conveyor units more in detail;

Figure 4 is a side elevation of Figure 3, partly in section, to show the means for tilting the units and retarding the movement of material thereover;

Figure 5:
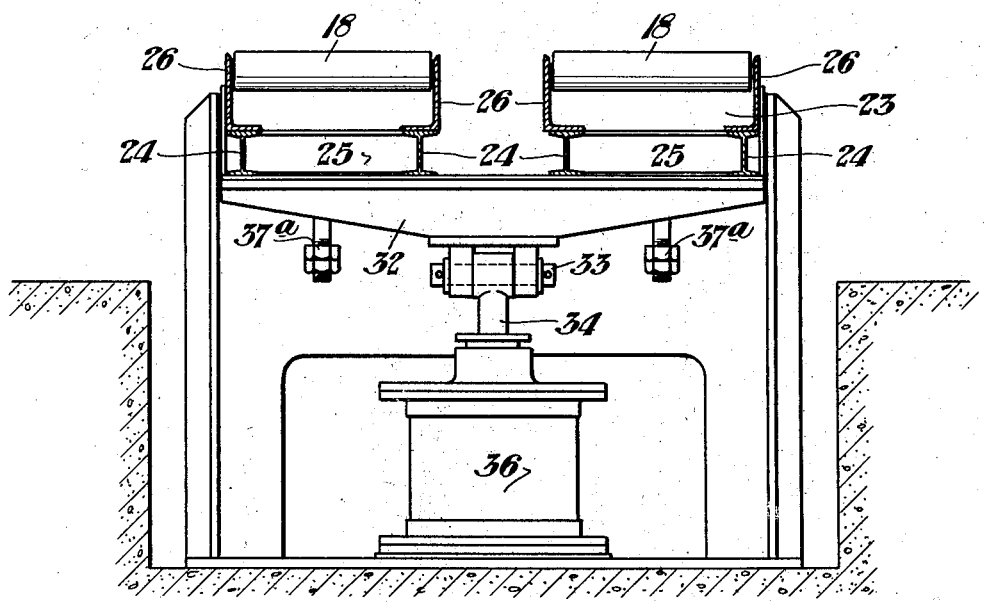
Figure 5 is a section on line V—V of Figure 4.
Figure 6:
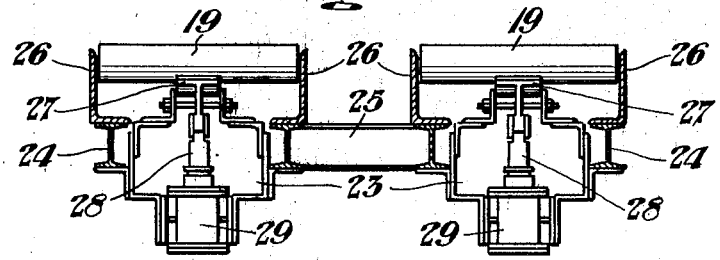
Figure 6 is a section on line VI—VI of Figure 4.

In the drawings, there is shown a plurality of conveyor units utilized to convey heavy, bulky piles of sheet metal which, as illustrated in Figure 2, are first formed by being piled upon parallel wooden skids 2 resting on an inclined piler 3 and restrained as to forward movement by a removable stop 4, and adjustable as to uniform piling by opposed side guides 5, said side guides being adjusted toward and away from each other by hand operated screws 6. These single sheets, as made into piles 11, may come, for example, from continuous strip metal which has been cut into predetermined lengths by a rotary flying shear 7, of the conventional type, driven by a motor 8 through speed reduction gearing 9. The cut sheets are fed upwardly toward the piler 3 by endless conveyors 12 driven by a motor 13 and chain connection 14 through a speed reduction mechanism 15. The sheets singly enter the piler 3 through feed-in pinch-rolls 16.

The pile of sheets, having been made up to the desired size and height, is released from the piler 3 by removing the stop 4 and manually retracting the side guides 5. The fact that the piler 3 is inclined permits the piled material to be readily conveyed, by its own weight, to a scale platform 17 where it may be, if desired, momentarily stopped for weighing. This retarding of its forward movement is brought about by maintaining, in its bed, idler conveying rollers 18 and brake rollers 19 which are secured in a bracket 20 and caused to be lifted vertically by a hydraulically operated plunger 21 of the conventional type. Thus, if a heavy pile of sheets should appear to have such momentum as would carry it partially or wholly beyond the scale platform 17, these rollers 19 are raised vertically and, upon contacting the skid 2, tend to gradually and firmly retard further forward movement of the pile.

After weighing, the pile of sheets is allowed to again move forward by lowering the vertically movable braking rollers 19 and the piler then proceeds to pass over the entire length of like abutting conveyor units 23 to a discharge platform.

These conveyor units 23 are identical in construction and abut each other in end-to-end relation. A description of one of said units will therefore suffice for all others.

Thus, in Figures 2 to 6 inclusive, the conveyor unit 23 is made up of a rectangular frame-like structure comprising longitudinally extending beams 24 cross-braced by beams 25. Mounted on the beams 24 are upwardly extending opposed supports 26 between each of which are suitably mounted parallel spaced idling rollers 18.

Adjacent the forward end of the unit is a series of parallel brake rollers 19. The mechanism for operating the brake rollers includes a holding-bracket 27 attached to a vertically disposed shaft 28 and operated by a conventional type of pressure cylinder 29 whereby the brake rollers are raised and/or lowered as desired.

The conveyor unit 23 is supported at its extreme end by opposed brackets 30 which are hinged at 31 to allow the conveyor unit to be tilted upwardly and forwardly.

This tilting action is brought about at the rear of each of the conveyors by a transverse supporting bracket 32, secured in any suitable manner to beams 24 and cross-braces 25, as shown in Figure 5. This bracket 32 is attached to and swivels at 33 in the end of a vertically disposed shaft 34 which, in turn, is raised and/or lowered, as desired, by means of a head 35 movable vertically by fluid pressure within the cylinder 36. The downward movement of the unit is limited by causing the entrance end of the conveyor 23 to rest upon a supporting beam structure 37, while its upward movement is restricted by bolts 37a adjusted to engage the undersurface of the supporting beam structure 37.

In operation, and by way of example only, thin, wide metallic strip material is fed into and through a flying shear 7, in any convenient manner, and conveyed upwardly by the conveyor 12 through pinched guide-rolls 16 to an inclined piler 3. The pile of single sheets 11, having been placed on the skid 2, are then released by removing the stop 4 and side guides 5, whereupon the pile may move by gravity from the downwardly inclined piler 3 onto the abutting and inclined scale platform 17 where it may be weighed, if so desired. If not weighed, the brake rollers 19 in the platform 17 remain in a plane with its adjacent idler rollers 18 and the pile passes along adjacent horizontally positioned conveyor units 23.

However, should it be desired to retain the pile 11 on the scale platform 17 long enough to establish its weight, its forward momentum thereover is checked momentarily by actuating the braking rollers 19 upwardly under the skid 2 and the superimposed pile of sheets 11 to check further advance of said pile until weighing is completed.

The downward release of rollers 19 then permits the pile 11 to ride on the slightly inclined scale platform 17 and its forward movement is again established.

The piler then travels over as many horizontally disposed and abutting conveyor units as desired, there being no inclination of the non-driven rollers 18 which constitute the conveying means. Due to the horizontal position of the rollers, the pile moving thereover soon stops, wherefrom the particular conveyor unit 23 on which the majority of the pile may rest is tilted upwardly at its extreme rear and, by actuating the fluid cylinder 36, the shaft 34 is raised to produce the tilting action of the entire conveyor unit around the swivel 31.

Thus the pile is urged forwardly, as and when desired, and its progress is thus controlled toward its destination. As soon as the unit has been tilted and the pile urged forward to the next succeeding or following units, the fluid actuating cylinder 36 is reversed in operation and the rear end of said unit is restored to a plane common to its companion unit.

It may be desirable to load the conveyor unit with as many piles as possible and to maintain the units in end-to-end relation, in which case abnormal urging of the oncoming pile might contact the preceding stationary pile within a short distance without damaging force.

In this event, if it is noted that the tilting action were sufficient on any one preceding conveyor as to give excess momentum to the moving pile, the movement of the pile may be braked to any degree desired, by actuating the braking rollers 19 upwardly. These rollers 19 are raised upwardly through the movement of shaft 28.

However, upon the downward movement of the rolls 19, the pile returns to a horizontal plane and to impart momentum to the same, it is necessary to tilt the end of the conveyor on which the majority of the pile may rest. In this manner, the pile proceeds along the horizontally disposed roller conveyors without the necessity of driven rollers or the need of permanently inclining the conveyor units to establish a gravity feed.

As the pile approaches the end of the conveyor, it may be transferred to a truck 37, whereupon the pile or piles may be transported to any point desired.

While I have shown and described my improved conveyor system as handling piles of heavy metallic sheets, the same may be readily utilized in conveying other articles or pieces. Furthermore, the roller lifting means, while shown as being hydraulic cylinders, may be any conventional lifting means, either approximately or remotely controlled.

While I have shown and described a specific embodiment of my invention, it will be understood that I do not wish to be limited exactly thereto, since various modifications may be made without departing from the scope of the invention as defined by the following claims.

I claim:

1. In the continuous treatment of articles cut into predetermined lengths, means for conveying said articles to a piler and one or more conveyor units adapted to transfer said piled articles to a discharge platform, said conveyor units including non-driven freely rotating rollers adapted to transfer said piled articles to adjoining units, said conveyor units including means for raising the end of said units out of their normal horizontal plane and means adapted to retard movement of said piled articles over said units at any desired point along the line of travel of said material, said retarding means carried by each unit and operable independently of each other and independently of the means for raising the units out of their normal horizontal plane.

2. In the continuous treatment of articles, a conveyor comprising at least one unit including a frame adapted to support non-driven freely rotating rollers, means on the rear end of said unit adapted to raise the rear end of said unit out of its normal horizontal plane and means on said unit adapted to retard the movement of material over said freely rotating rollers, said retarding means operable independently of the means for raising the unit out of its normal horizontal plane.

3. A material conveying device comprising a plurality of sections, each of said sections normally resting in a substantially horizontal plane and including means for freely moving material thereover, means for tilting upwardly only the rearward end of each of said sections whereby the material thereon is urged forward from one section to another, and means on each of said tiltable sections for retarding the forward movement of material thereover operable when said rear ends of said sections are tilted upwardly.

4. A material conveying device comprising a plurality of sections, each of said sections normally resting in a horizontal plane, material conveying means on said sections, means on each of said sections adapted to move that one of said sections on which the material initially rests out of its normal horizontal plane, and means adapted to retard the movement of said material over said sections operable when the rearward ends only of said sections have been tilted.

5. A material conveying device comprising a plurality of sections, each of said sections normally resting in a substantially horizontal plane and including means for freely moving material thereover, means for tilting upwardly only the rearward end of each of said sections whereby the material thereon is urged forward from one section to another, and means on each of said tiltable sections for retarding the forward movement of material thereover.

HARRY G. HAGUE.